(12) United States Patent
Skikun et al.

(10) Patent No.: US 10,723,275 B2
(45) Date of Patent: Jul. 28, 2020

(54) SECURE ACCESS TO STORAGE DEVICES WITHIN VEHICLE CARGO COMPARTMENTS

(71) Applicant: Ford Global Technologies, LLC, Dearborn, MI (US)

(72) Inventors: Steven T. Skikun, Commerce Township, MI (US); Robert S. Kern, Eastpointe, MI (US); Arie Groeneveld, Bloomfield Hills, MI (US); Frank J. Desjarlais, Canton, MI (US); Jon Ohland, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 16/146,006

(22) Filed: Sep. 28, 2018

(65) Prior Publication Data

US 2020/0101903 A1    Apr. 2, 2020

(51) Int. Cl.
| | | |
|---|---|---|
| *F41C 33/06* | (2006.01) | |
| *B60R 7/14* | (2006.01) | |
| *E05B 65/00* | (2006.01) | |
| *A47B 81/00* | (2006.01) | |
| *B60R 25/01* | (2013.01) | |
| *B60R 25/24* | (2013.01) | |
| *B60R 5/04* | (2006.01) | |
| *B60R 11/00* | (2006.01) | |

(52) U.S. Cl.
CPC ............ *B60R 7/14* (2013.01); *E05B 65/0075* (2013.01); *F41C 33/06* (2013.01); *A47B 81/005* (2013.01); *B60R 5/04* (2013.01); *B60R 25/01* (2013.01); *B60R 25/245* (2013.01); *B60R 2011/0098* (2013.01)

(58) Field of Classification Search
CPC .......... F41C 33/06; Y10S 292/04; B60R 5/04; B60R 7/14; B60R 7/02; B60R 25/24
See application file for complete search history.

(56) References Cited

U.S. PATENT DOCUMENTS

| | | | | |
|---|---|---|---|---|
| 3,744,285 A | * | 7/1973 | Barmherzig | ............ B60R 25/04 70/241 |
| 4,143,368 A | * | 3/1979 | Route | ................. B60R 25/1001 340/426.17 |
| 4,189,712 A | * | 2/1980 | Lemelson | ............. E05B 49/006 235/382 |
| 4,477,874 A | * | 10/1984 | Ikuta | .................... B60N 2/0248 307/10.7 |
| 4,702,094 A | | 10/1987 | Peterson | |
| 4,911,296 A | * | 3/1990 | Hart, Jr. | ................. B25H 3/023 206/373 |

(Continued)

*Primary Examiner* — Brian D Nash

(74) *Attorney, Agent, or Firm* — Frank Lollo; Eversheds Sutherland (US) LLP

(57) ABSTRACT

Method and apparatus are disclosed for secure access to storage devices within vehicle cargo compartments. An example vehicle includes a rear gate including a gate lock, a cargo compartment accessible via the rear gate, a storage device positioned within the cargo compartment and including a storage lock, and a body control module (BCM) communicatively coupled to the gate lock and the storage lock. The BCM is to simultaneously unlock the rear gate and the storage device for a predefined period-of-time responsive to receiving a storage-access request.

20 Claims, 4 Drawing Sheets

(56) References Cited

U.S. PATENT DOCUMENTS

| | | | |
|---|---|---|---|
| 5,125,710 A * | 6/1992 | Gianelo | B60R 9/02 224/281 |
| 5,808,375 A | 9/1998 | Armbruster et al. | |
| 5,816,546 A | 10/1998 | Miller | |
| 5,964,492 A * | 10/1999 | Lyon | B60R 9/00 224/404 |
| 6,260,300 B1 * | 7/2001 | Klebes | F41A 17/066 206/317 |
| 6,474,122 B2 * | 11/2002 | Davis | E05B 17/2092 70/278.3 |
| 6,572,168 B1 * | 6/2003 | Radstake | B60R 7/04 224/311 |
| 6,619,770 B1 * | 9/2003 | Drab | G07F 7/02 312/333 |
| 6,729,516 B2 * | 5/2004 | Hanagan | B62J 9/001 224/419 |
| 6,752,304 B1 * | 6/2004 | Hotary | B60K 37/00 224/544 |
| 6,843,081 B1 * | 1/2005 | Painter | F41C 33/06 109/45 |
| 7,200,965 B2 | 4/2007 | Vor Keller et al. | |
| 8,115,620 B2 | 2/2012 | Breed | |
| 8,136,897 B2 * | 3/2012 | Mascari | A47B 46/005 16/342 |
| 8,752,745 B2 * | 6/2014 | Bond | B62J 9/001 206/317 |
| 9,221,400 B1 * | 12/2015 | Setina | B60R 5/04 |
| 9,321,402 B2 * | 4/2016 | Nedelman | B60R 11/06 |
| 9,656,629 B2 * | 5/2017 | Groeneveld | B60R 25/01 |
| 10,195,998 B2 * | 2/2019 | Lundberg | B60R 7/14 |
| 2002/0121967 A1 | 9/2002 | Bowen et al. | |
| 2012/0197508 A1 * | 8/2012 | Seaman | F02D 41/08 701/102 |
| 2013/0134193 A1 * | 5/2013 | Mothersele | B60R 7/00 224/281 |
| 2014/0042766 A1 * | 2/2014 | Meyer | B60R 25/24 296/37.8 |
| 2014/0176363 A1 | 6/2014 | Lam et al. | |
| 2015/0217631 A1 * | 8/2015 | Warburton | E05F 15/63 49/207 |
| 2016/0347279 A1 * | 12/2016 | Groeneveld | B60R 25/01 |
| 2017/0074617 A1 | 3/2017 | Stewart et al. | |
| 2017/0162030 A1 | 6/2017 | Rajnath | |
| 2017/0337437 A1 * | 11/2017 | Kanagaraj | G01G 19/08 |
| 2018/0170311 A1 * | 6/2018 | Wilt | H04W 4/02 |
| 2018/0241489 A1 * | 8/2018 | Daoura | H04W 40/22 |

* cited by examiner

SECURE ACCESS TO STORAGE DEVICES WITHIN VEHICLE CARGO COMPARTMENTS

TECHNICAL FIELD

The present disclosure generally relates to cargo compartments and, more specifically, to secure access to storage devices within vehicle cargo compartments.

BACKGROUND

A vehicle typically include a storage space that is located behind a rear seat of the vehicle. For instance, a sedan vehicle may include a trunk, and a sports utility vehicle (SUV) may include a cargo compartment. Oftentimes, the storage space is utilized to store object(s) of occupant(s) (e.g., a driver, a passenger) of the vehicle. In some instances, a public services vehicle (e.g., a police vehicle, a fire department vehicle, an emergency medical services vehicle, etc.) include special equipment installed in the storage space to facilitate the secure storage of special devices for the public servant (e.g., a police officer, a firefighter, a paramedic, an emergency medical technician, etc.).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for secure access to storage devices within vehicle cargo compartments. An example disclosed vehicle includes a rear gate including a gate lock, a cargo compartment accessible via the rear gate, a storage device positioned within the cargo compartment and including a storage lock, and a body control module (BCM) communicatively coupled to the gate lock and the storage lock. The BCM is to simultaneously unlock the rear gate and the storage device for a predefined period-of-time responsive to receiving a storage-access request.

In some examples, the rear gate includes a liftgate or a tailgate. In some examples, the storage device includes a gun-lock rack or a weapons safe.

Some examples further include a cabin adjacent to the cargo compartment and a storage switch located within the cabin. Some such examples further include an ignition switch and an ignition sensor. Further, in some such examples, the BCM is configured to receive the storage-access request when the storage switch is toggled to an unlock position while the ignition sensor detects that the ignition switch is in a start position or a run position.

Some examples further include a communication module for wireless communication. In such examples, the BCM is configured to receive the storage-access request from at least one of a key fob, a mobile app, and a remote server via the communication module.

In some examples, the BCM is configured to simultaneously relock the rear gate and the storage lock after the predefined period-of-time.

Some examples further include a position sensor configured to detect whether the rear gate is open or closed. In such examples, the BCM is configured to simultaneously relock the rear gate and the storage lock in response to determining, via the position sensor, that the rear gate has been opened and subsequently closed during the predefined period-of-time.

Some examples further include a cabin adjacent to cargo compartment, doors for accessing the cabin, and door locks for the doors. Some such examples further include a door switch located within the cabin. Further, in some such examples, the BCM unlocks the doors in response to identifying that the door switch is toggled to an unlock position. Further, in some such examples, the BCM simultaneously locks the doors, the rear gate, and the storage device in response to identifying that the door switch is toggled to a lock position.

An example disclosed method includes receiving a storage-access request via a body control module (BCM) of a vehicle and unlocking a gate and a storage device for a predefined period-of-time responsive to receiving the storage-access request. The storage device is positioned within a cargo compartment and includes a storage lock, the cargo compartment is accessible via the gate, and the gate includes a gate lock.

In some examples, the BCM receives the storage-access request when a storage switch is toggled to an unlock position while an ignition sensor detects that an ignition switch is in a start position or a run position. In some examples, the BCM receives the storage-access request, via a communication module of the vehicle, from at least one of a key fob, a mobile app, and a remote server.

Some examples further include relocking the gate and the storage lock via the BCM. In some such examples, the BCM relocks the gate and the storage lock after the predefined period-of-time. In some such examples, the BCM relocks the gate and the storage lock in response to determining, via a position sensor of the gate, that the gate has been opened and subsequently closed during the predefined period-of-time. In some such examples, the BCM relocks the gate and the storage lock in response to identifying that a door switch is toggled to a lock position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
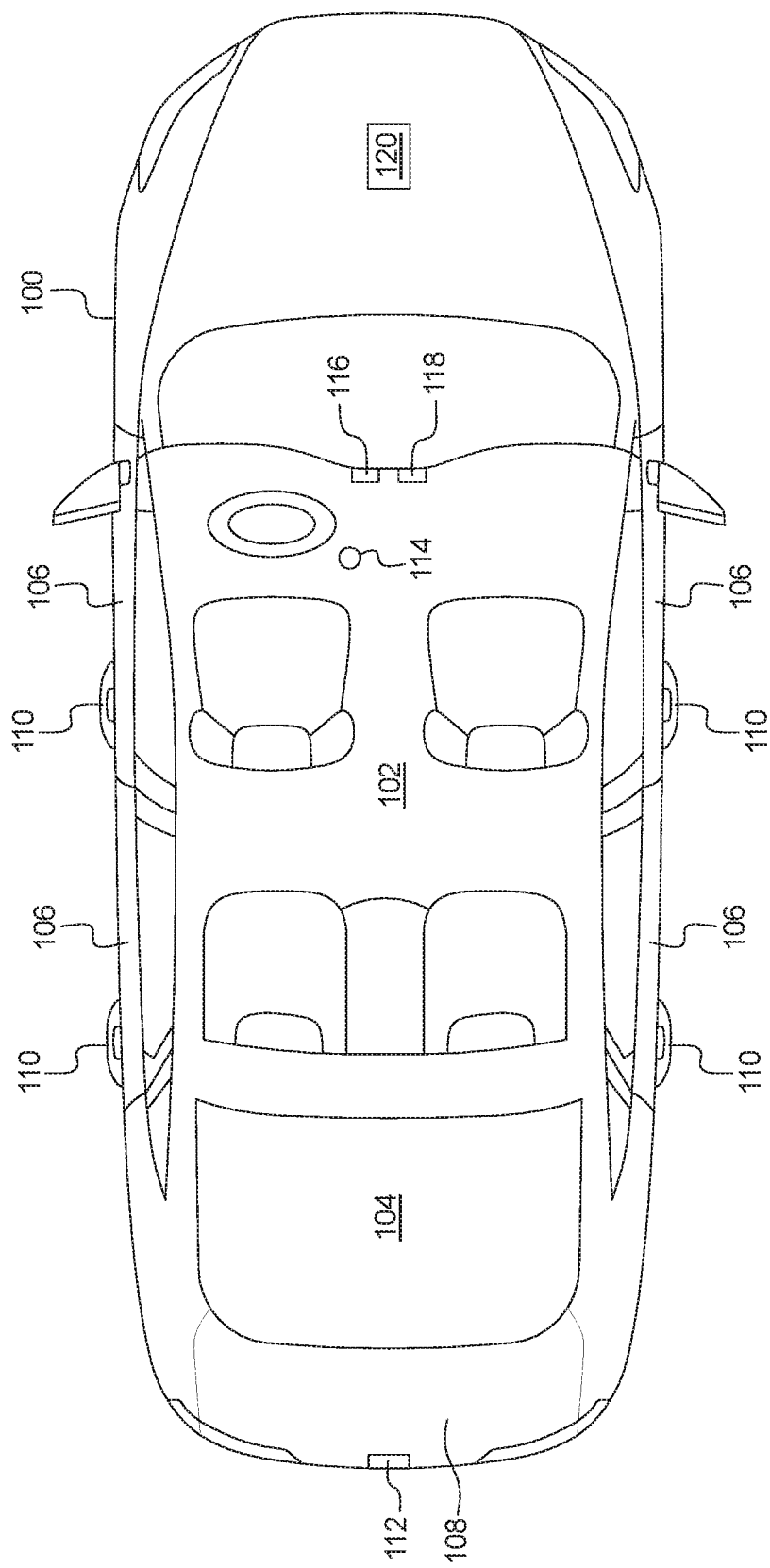
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle typically include a storage space that is located behind a rear seat of the vehicle. For instance, a sedan vehicle may include a trunk, and a sports utility vehicle (SUV) may include a cargo compartment. Oftentimes, the storage space is utilized to store object(s) of occupant(s) (e.g., a driver, a passenger) of the vehicle.

In some instances, a public services vehicle (e.g., a police vehicle, a fire department vehicle, an emergency medical services vehicle, etc.) include special equipment installed in the storage space to facilitate the secure storage of special devices for the public servant (e.g., a police officer, a firefighter, a paramedic, an emergency medical technician, etc.). For instance, a police vehicle may include a gun rack to securely store weapons (e.g., shotguns, assault rifles, etc.). Some police vehicles deter unauthorized personnel from accessing the weapons by implementing an elaborate authentication sequence to (i) unlock a vehicle door for accessing the cargo compartment and (ii) subsequently unlock the gun rack. In some instances, such authentication sequences potentially prevent police officers from quickly accessing the weapons in a timely manner.

Examples methods and apparatus disclosed herein securely provide access to objects (e.g., weapons) stored within and/or to a storage device (e.g., a gun-lock rack, a weapons safe, etc.) that is located within a vehicle (e.g., a police vehicle, a fire department vehicle, an emergency medical services vehicle, and/or any other public services vehicle). Examples disclosed herein include a storage device located within a cargo compartment of a vehicle. The storage device is accessible via a rear gate (e.g., a liftgate, a tailgate, etc.) of the vehicle. A controller of the vehicle simultaneously unlocks the gate and the storage device (e.g., within 1 second of each other) for a predetermined period-of-time (e.g., 45 seconds) in response to (1) a dedicated in-vehicle switch being engaged when an ignition of the vehicle is in a run or start position, (2) a dedicated button of a key fob being pressed, (3) a mobile app of a mobile device sending a remote unlock signal, and/or (4) a remote server sending a remote unlock signal. The controller locks the gate and the storage device in response to (1) the predetermined period-of-time lapsing, (2) the gate being opened and subsequently closed, and (3) a door-lock signal being received.

Turning to the figures, FIG. 1 illustrates an example vehicle 100 in accordance with the teachings herein. In the illustrated example, the vehicle 100 (e.g., a sports utility vehicle or SUV) is a police vehicle, a fire department vehicle, an emergency medical services vehicle, and/or any other public services vehicle that is configured to store object(s) (e.g., weapons, medical equipment, etc.) in a secure manner. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes a cabin 102 and a cargo compartment 104. For example, the cabin 102 includes seats on which occupants sit while the vehicle 100 is travelling. The cargo compartment 104 is adjacent to the cabin 102 and is configured to store cargo and/or other object(s) while the vehicle 100 is travelling. The vehicle 100 also includes doors 106 and a gate 108. The doors 106 are configured to (1) open to provide access to the cabin 102 and (2) close to enclose occupant(s) and/or other object(s) within the cabin 102. Further, the gate 108 is configured to (1) open to provide access to the cargo compartment 104 and (2) close to enclose object(s) within the cargo compartment 104. That is, the cabin 102 is accessible via the doors 106 and the cargo compartment 104 is accessible via the gate 108. In the illustrated example, the gate 108 is a rear gate (e.g., a liftgate, a tailgate) that provides access to the cargo compartment 104 that is located at a rear of the vehicle 100.

In the illustrated example, the doors 106 include door locks 110, and the gate 108 includes a gate lock 112. Each of the door locks 110 are configured to transition between a locked position and an unlocked position. When in a locked position, each of the door locks 110 prevents a corresponding one of the doors 106 from being opened. Conversely, when in an unlocked position, each of the door locks 110 enables a corresponding one of the doors 106 to be opened. Similarly, when in a locked position, the gate lock 112 prevents the gate 108 from being opened. When in an unlocked position, the gate lock 112 enables the gate 108 to be opened.

The vehicle 100 of the illustrated examples also includes an ignition switch 114, a storage switch 116, a door switch 118 located within the cabin 102. The ignition switch 114 is, for example, a rotary switch and/or a pushbutton to enable a user to control an operating state of the vehicle 100. For example, the ignition switch 114 includes an on position, a start position, an accessory position, and/or a lock position. The storage switch 116 is an input device, such as a toggle switch, a rotary switch, and/or a pushbutton, that enables a user to control operation of the gate 108 and a storage device (e.g., a storage device 200 of FIG. 2) positioned within the cargo compartment 104. For example, the gate lock 112 unlocks and/or a lock of the storage device (e.g., a storage lock 206 of FIG. 2) unlocks when the storage switch 116 is toggled to an unlock position when the ignition switch 114 is in an on position or a start position. The door switch 118 is an input device, such as a toggle switch and/or a pushbutton, that enables a user to control operation of the doors 106. For example, the door locks 110 unlock when the door switch 118 is toggled to an unlock position and lock when the door switch 118 is toggled to lock position. Further, in some examples, the gate lock 112 and/or the lock of the storage device unlock when the door switch 118 is toggled to the lock position.

In the illustrated example, the vehicle 100 includes a controller 120 that is configured to control access to the cabin 102, the cargo compartment, and the storage device. That is, the controller 120 controls operation of the door locks 110, the gate lock 112, and the lock of the storage device.

Figure 2:
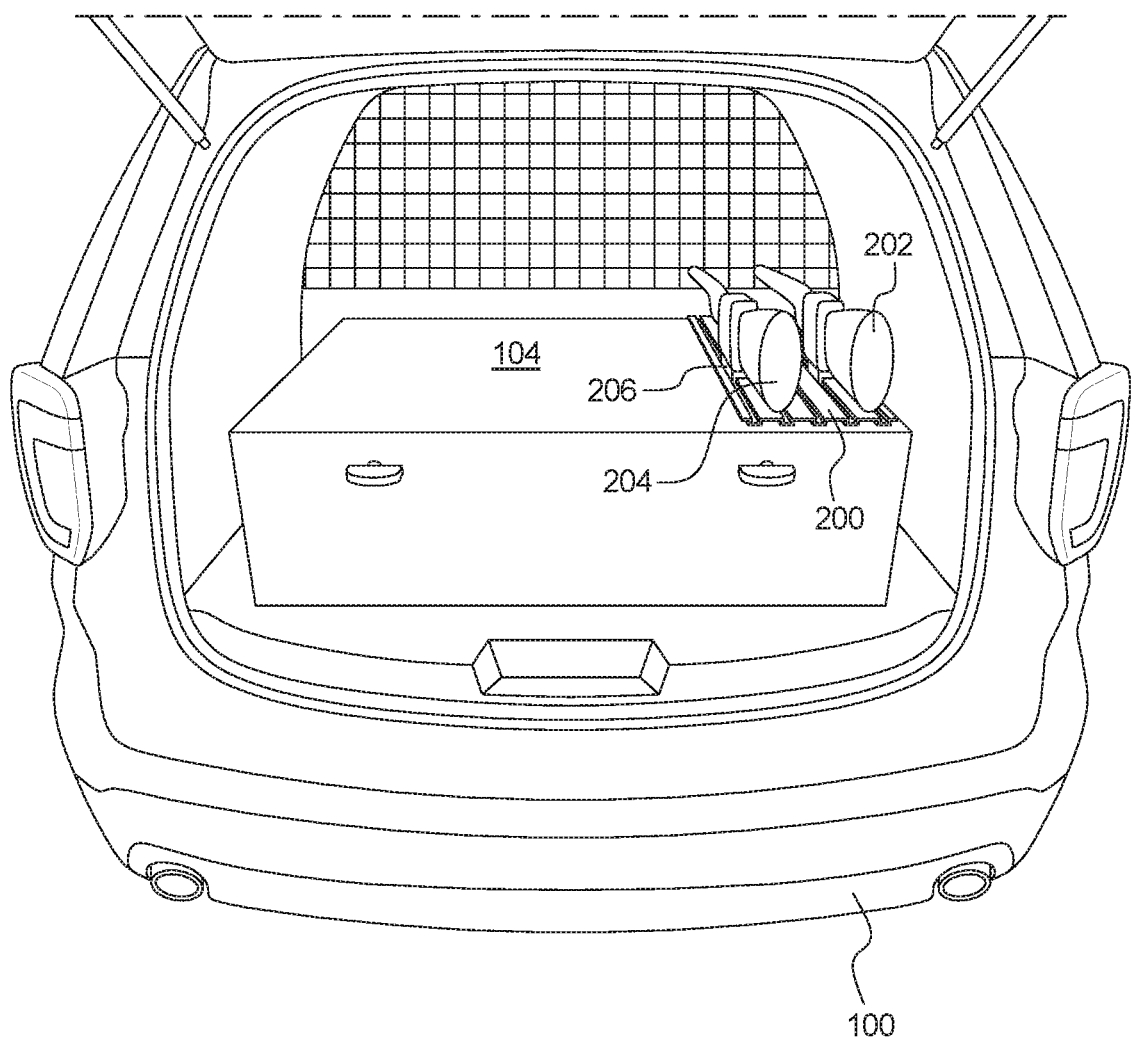
FIG. 2 illustrates an example storage device within a cargo compartment of the vehicle of FIG. 1.

FIG. 2 illustrates an example storage device 200 positioned within the cargo compartment 104 of the vehicle 100. In the illustrated example, the vehicle 100 is an SUV for police, and the storage device 200 is a gun-lock rack that securely stores a gun 202 and a gun 204 (e.g., long guns such as nonlethal shotgun(s), lethal shotgun(s), assault rifle(s), etc.). In other examples, the storage device 200 is a weapons safe and/or any other device that is configured to securely store objects in a locked manner. As used herein, a "storage device" refers to a device that is configured to store object(s) and includes a lock to control access to the stored object(s)

in a secure manner. As illustrated in FIG. 2, the storage device 200 includes a storage lock 206 that is configured to transition between a locked position and an unlocked position. When in a locked position, the storage lock 206 prevents access to object(s) (e.g., the gun 202, the gun 204, etc.) securely stored by the storage device 200. Conversely, when in an unlocked position, the storage lock 206 enables object(s) stored by the storage device 200 to be accessed.

Figure 3:
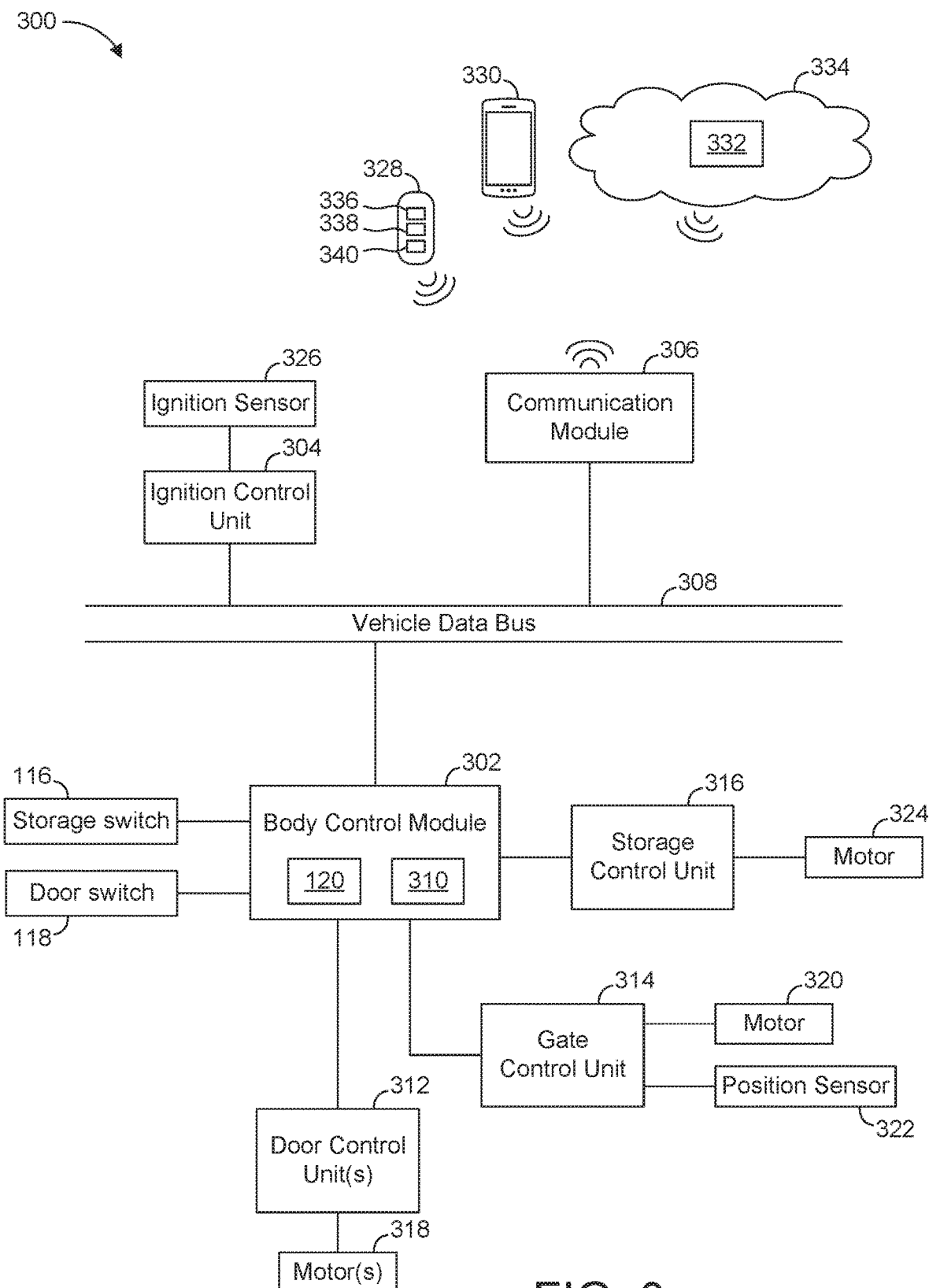
FIG. 3 is a block diagram of electronic components of the vehicle of FIG. 1.

FIG. 3 is a block diagram of electronic components 300 of the vehicle 100. As illustrated in FIG. 3, the electronic components 300 include a body control module 302, an ignition control unit 304, a communication module 306, and a vehicle data bus 308.

The body control module 302 (also referred to as the BCM) of the illustrated example is an electronic control unit (ECU). ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs communicate and exchange information via a vehicle data bus (e.g., the vehicle data bus 308). Additionally, the ECUs may communicate properties (e.g., status of the ECUs, sensor readings, control state, error and diagnostic codes, etc.) to and/or receive requests from each other. For example, the vehicle 100 may have dozens of ECUs that are positioned in various locations around the vehicle 100 and are communicatively coupled by the vehicle data bus 308 and/or other communicative connections.

The body control module 302 of the illustrated example includes the controller 120 (also referred to as a microcontroller unit and a controller) and memory 310. In other examples, the controller 120 is separate from the body control module 302 (e.g., incorporated into another ECU). The controller 120 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 310 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 310 includes multiple kinds of memory, particularly volatile memory and non-volatile memory.

The memory 310 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 310, the computer readable medium, and/or within the controller 120 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The body control module 302 controls one or more subsystems throughout the vehicle 100, such as power windows, an immobilizer system, power mirrors, etc. For example, the body control module 302 includes circuits that drive one or more of relays (e.g., to control wiper fluid, etc.), brushed direct current (DC) motors (e.g., to control power seats, power windows, wipers, etc.), stepper motors, LEDs, etc. In the illustrated example, the body control module 302 is communicatively coupled to a plurality of switches and other ECUs to control access to the cabin 102, the cargo compartment 104, and objects stored by the storage device 200. For example, the body control module 302 is communicatively coupled to (i) door control units 312 to control the door locks 110 of the doors 106, (ii) a gate control unit 314 to control the gate lock 112 of the gate 108, and (iii) a storage control unit 316 to control the storage lock 206 of the storage device 200. That is, the body control module 302 is communicatively coupled to the door locks 110, the gate lock 112, and the storage lock 206 to control their operation.

The door control units 312, the gate control unit 314, and the storage control unit 316 are ECUs of the vehicle 100. Each of the door control units 312 controls operation of one or more subsystems of a corresponding one of the doors 106. For example, each of the door control units 312 controls operation of a motor 318 that actuates to lock and/or unlock a corresponding one of the door locks 110. The gate control unit 314 controls operation of one or more subsystems of the gate 108. For example, the gate control unit 314 controls operation of a motor 320 that actuates to lock and/or unlock the gate lock 112 of the gate 108. In the illustrated example, the gate control unit 314 also is coupled to a position sensor 322 that is configured to detect whether the gate 108 is open (i.e., in an open position) or closed (i.e., in a closed position). Further, the storage control unit 316 controls operation of one or more subsystems of the storage device 200. For example, the storage control unit 316 controls operation of a motor 324 that actuates to lock and/or unlock the storage lock 206 of the storage device 200.

In the illustrated example, the body control module 302 also is communicatively coupled to the storage switch 116 and the door switch 118. For example, the body control module 302 is communicatively coupled to the storage switch 116 to identify when the storage switch 116 has been toggled to an unlock position. The body control module 302 is communicatively coupled to the door switch 118 to identify when the door switch 118 has been toggled to an unlock position and/or a lock position. For example, the body control module 302 is configured to unlock one or more of the door locks 110 in response to identifying that the door switch 118 has been toggled to the lock position. Further, the body control module 302 is configured to simultaneously lock the door locks 110, the gate lock 112, and the storage lock 206 (e.g., within 1 second of each other) in response to identifying that the door switch 118 has been toggled to the lock position.

Further, in the illustrated example, the ignition control unit 304 is an ECU that is configured to monitor a position (a key-on position, a key-off position, a start position, an accessory position) of the ignition switch 114. For example, the ignition control unit 140 includes and/or is communicatively connected to an ignition sensor 326 that monitors the position of the ignition switch 114.

The communication module 306 includes wired or wireless network interfaces to enable communication with other devices and/or external networks. For example, the communication module 306 is configured to wirelessly communicate with a key fob 328 of an operator (e.g., a police officer, emergency personnel, etc.), a mobile device 330 of an operator, and/or a remote server 332 via an external network 334. As used herein, a "key fob" refers to a dedicated electronic mobile device that wirelessly communicates with a vehicle to unlock and/or lock vehicle door(s), open and/or close the vehicle door(s), activate an engine of the vehicle, and/or control other function(s) of the vehicle. In some examples, a user of a vehicle utilizes another mobile device, such as the mobile device 330), that functions as a phone-as-a-key for the vehicle. As used herein, a "phone-as-a-key" refers to an electronic mobile device (e.g., a smart phone, a wearable, a smart watch, a tablet, etc.) that includes hardware and/or software to function as a key fob.

In the illustrated example, the communication module 306 includes a wireless personal area network (WPAN) module that is configured to wirelessly communicate with the key fob 328, the mobile device 330, and/or other devices via short-range wireless communication protocol(s). In some examples, the communication module 306 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 306 is configured to wirelessly communicate via Wi-Fi®, Near Field Communication (NFC), ultra-wide band (UWB) communication, ultra-high frequency (UHF) communication, low frequency (LF) communication, and/or any other communication protocol that enables the communication module 306 to communicatively couple to the key fob 328, the mobile device 330, and/or another device.

Further, the external network 334 may be a public network, such as the Internet; a private network, such as an intranet; or combinations thereof, and may utilize a variety of networking protocols now available or later developed including, but not limited to, TCP/IP-based networking protocols. The communication module 306 includes hardware (e.g., processors, memory, storage, antenna, etc.) and software to control the wired or wireless network interfaces for communication with the external network 334. For example, the communication module 306 includes one or more communication controllers for cellular networks, such as Global System for Mobile Communications (GSM), Universal Mobile Telecommunications System (UMTS), Long Term Evolution (LTE), Code Division Multiple Access (CDMA).

In the illustrated example, the key fob 328 includes an unlock button 336, a lock button 338, and a storage button 340. For example, when the unlock button 336 is pressed, the key fob 328 sends a signal to the body control module 302, via the communication module 306, to cause the body control module 302 to unlock one or more of the door locks 110. When the lock button 338 is pressed, the key fob 328 sends a signal to the body control module 302, via the communication module 306, to cause the body control module 302 to simultaneously lock the door locks 110, the gate lock 112, and the storage lock 206. Further, when the storage button 340 is pressed, the key fob 328 sends a signal to the body control module 302, via the communication module 306, to cause the body control module 302 to simultaneously unlock the gate lock 112 and the storage lock 206.

Further, in the illustrated example, a mobile app is configured to operate on the mobile device 330 that enables an operator to remotely control functions of the vehicle 100. For example, the mobile app is configured to present an interface via a touchscreen of the mobile device 330 that includes an unlock button, a lock button, and a storage button. When the unlock button is pressed, the mobile device 330 sends a signal to the body control module 302, via the communication module 306, to cause the body control module 302 to unlock one or more of the door locks 110. When the lock button is pressed, the mobile device 330 sends a signal to the body control module 302, via the communication module 306, to cause the body control module 302 to simultaneously lock the door locks 110, the gate lock 112, and the storage lock 206. Further, when the storage button is pressed, the mobile device 330 sends a signal to the body control module 302, via the communication module 306, to cause the body control module 302 to simultaneously unlock the gate lock 112 and the storage lock 206. The mobile app of the mobile device 330 enables emergency personnel corresponding with different vehicles to securely access the storage device 200 of the vehicle 100. For example, if a plurality of emergency personnel are at a particular location, the mobile app enables one of the emergency personnel to quickly and securely access a weapon from as storage device of the nearest vehicle (e.g., the storage device 200 of the vehicle 100).

Additionally or alternatively, an operator from a remote location is able to securely control access to the storage device 200 for personnel located near the vehicle 100. For example, the remote server 332 sends a signal to the body control module 302, via the communication module 306, to cause the body control module 302 to unlock one or more of the door locks 110 for emergency personnel located near the vehicle 100.

In operation, the body control module 302 simultaneously unlocks the gate 108 and the storage device 200 (e.g., within 1 second of each other) for a predefined period-of-time (e.g., 45 seconds) in response to receiving a storage access request. For example, the body control module 302 receives a storage access request when the storage switch 116 is toggled to an unlock position while the ignition sensor 326 detects that the ignition switch 114 is in a start position or a run position. Additionally or alternatively, the body control module 302 receives, via the communication module 306, a storage access request from (1) the key fob 328 when the storage button 340 is pressed, (2) the mobile device 330 when a storage button of a mobile app is pressed, and/or (3) the remote server 332.

Subsequently, the body control module 302 simultaneously relocks the gate 108 and the storage device 200 (e.g., within 1 second of each other). In the illustrated example, the body control module 302 relocks the gate 108 of the vehicle 100 in response to (1) the predefined period-of-time lapsing, (2) the position sensor 322 detecting that the gate 108 has been opened and subsequently closed during the predefined period-of-time, and/or (3) the body control module 302 receiving a storage lock request. For example, the body control module 302 receives a storage lock request from (1) the door switch 118 when the door switch 118 is toggled to the lock position, (2) the key fob 328 when the lock button 338 is pressed, (3) the mobile device 330 when a lock button of the mobile app is pressed, and/or (4) the remote server 332.

Figure 4:
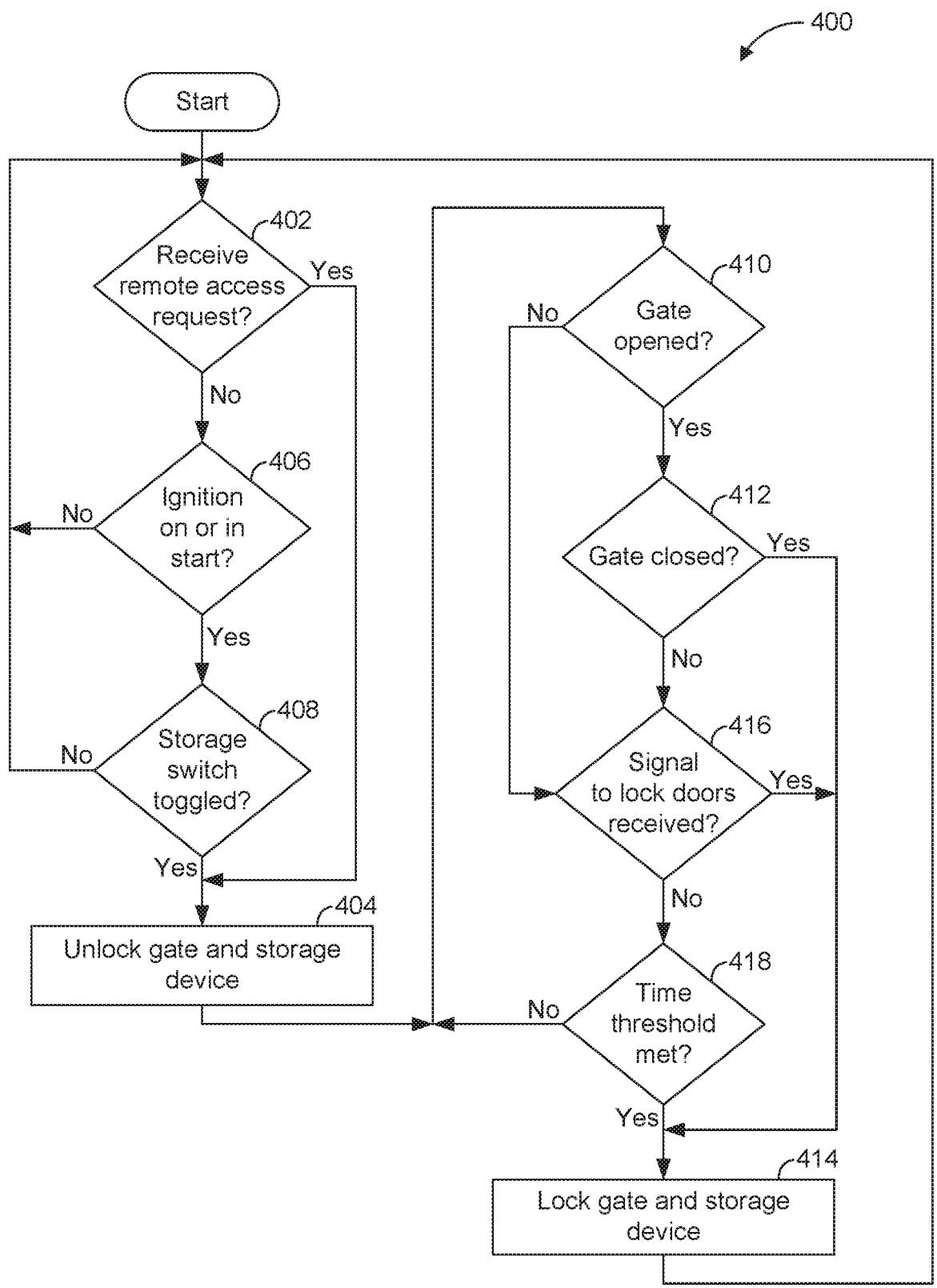
FIG. 4 is a flowchart for securely controlling access a storage device within a vehicle cargo compartment in accordance with the teachings herein.

FIG. 4 is a flowchart of an example method 400 to securely control access to a storage device within a vehicle cargo compartment. The flowchart of FIG. 4 is representative of machine readable instructions that are stored in memory (such as the memory 310 of FIG. 3) and include one or more programs which, when executed by a processor (such as the controller 120 of FIG. 3), cause the vehicle 100 to securely control access to weapons within the vehicle 100. While the example program is described with reference to the flowchart illustrated in FIG. 4, many other methods of securely controlling access to weapons within the vehicle 100 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the controller 120 of the body control module 302 determines whether the communication module 306 has received a remote storage-access request. For example, the communication module 306 is configured to receive a remote storage-access request from (1) the key fob 328, (2) a mobile app operating on the mobile device 330, and/or (3) the remote server 332. In response to the controller 120 determining that communication module 306 has received a remote storage-access request, the method 400 proceeds to block 404 at which the body control module 302 unlocks the gate 108 of the vehicle 100 and the storage device 200 within the cargo compartment 104 for a predefined period-of-time (e.g., 45 seconds) to enable a user to access object(s) securely stored by the storage device 200. Otherwise, in response to the controller 120 determining that communication module 306 has not received a remote storage-access request, the method 400 proceeds to block 406.

At block 406, the controller 120 of the body control module 302 determines whether the ignition switch 114 is in a start position or a run position. For example, the body control module 302 identifies a position of the ignition switch 114 via the ignition sensor 326. In response to the controller 120 determining that the ignition switch 114 is not in the start position or the run position (e.g., a lock position, an accessory position), the method 400 returns to block 402. Otherwise, in response to the controller 120 determining that the ignition switch 114 is in the start position or the run position, the method proceeds to block 408.

At block 408, the controller 120 of the body control module 302 determines whether the storage switch 116 located within the cabin 102 of the vehicle 100 has been toggled while the ignition switch 114 is in the start position or the run position. In response to the controller 120 determining that the storage switch 116 has not been toggled, the method 400 returns to block 402. Otherwise, in response to the controller 120 determining that the storage switch 116 has been toggled, the method 400 proceeds to block 404 at which the body control module 302 unlocks the gate 108 of the vehicle 100 and the storage device 200 within the cargo compartment 104 for a predefined period-of-time.

At block 410, while the gate 108 and the storage device 200 are unlocked, the controller 120 of the body control module 302 determines whether the gate 108 of the vehicle 100 has been opened. For example, the controller 120 utilizes the position sensor 322 of the gate 108 to determine whether the gate 108 is opened or closed. In response to the controller 120 determining that the gate 108 has been opened while unlocked, the method 400 proceeds to block 412 at which the controller determines whether the gate 108 has been closed after previously being opened. In response to the controller 120 determining that the gate 108 has been closed after previously being opened, the method 400 proceeds to block 414 at which the body control module 302 locks the gate 108 of the vehicle 100 and the storage device 200 within the cargo compartment 104. Upon completing block 414, the method returns to block 402.

Returning to block 410, the method 400 proceeds to block 416 in response to the controller 120 determining that the gate 108 has not been opened. Further, returning to block 412, the method 400 proceeds to block 416 in response to the controller 120 determining that the gate 108 has not been closed after previously being opened. At block 416, the controller 120 of the body control module 302 determines whether the body control module 302 has received a signal to lock the doors 106 and the gate 108. For example, the body control module 302 is configured to receive a signal to lock the doors 106 and the gate 108 (1) when the door switch 118 is toggled to a lock position and/or (2) from the key fob 328 and/or a mobile app of the mobile device 330 via communication module 306. In response to the controller 120 determining that the body control module 302 has received a lock signal, the method 400 proceeds to block 414 at which the body control module 302 locks the gate 108 of the vehicle 100 and the storage device 200 within the cargo compartment 104. Otherwise, in response to the controller 120 determining that the body control module 302 has received a lock signal, the method 400 proceeds to block 418.

At block 418, the controller 120 of the body control module 302 determines whether the gate 108 and the storage device 200 has been unlocked for a predefined period-of-time (e.g., 45 seconds). That is, the controller 120 determines whether a time threshold (e.g., a 45-second time threshold). In response to the controller 120 determining that the time threshold has been met, the method 400 proceeds to block 414 at which the body control module 302 locks the gate 108 of the vehicle 100 and the storage device 200 within the cargo compartment 104. Otherwise, in response to the controller 120 determining that the time threshold has not been met, the gate 108 and the storage device 200 remain unlocked and the method 400 returns to block 410.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a rear gate including a gate lock;
   a cargo compartment accessible via the rear gate;
   a storage device positioned within the cargo compartment and including a storage lock;
   a position sensor configured to detect whether the rear gate is open or closed; and
   a body control module (BCM) communicatively coupled to the gate lock and the storage lock, wherein the BCM is configured to simultaneously unlock the rear gate and the storage device for a predefined period-of-time responsive to receiving a storage-access request, and wherein the BCM is configured to simultaneously relock the rear gate and the storage lock in response to determining, via the position sensor, that the rear gate has been opened and subsequently closed during the predefined period-of-time.

2. The vehicle of claim 1, wherein the rear gate includes a liftgate or a tailgate.

3. The vehicle of claim 1, wherein the storage device includes a gun-lock rack or a weapons safe.

4. The vehicle of claim 1, further including a cabin adjacent to the cargo compartment and a storage switch located within the cabin.

5. The vehicle of claim 4, further including an ignition switch and an ignition sensor.

6. The vehicle of claim 5, wherein the BCM is configured to receive the storage-access request when the storage switch is toggled to an unlock position while the ignition sensor detects that the ignition switch is in a start position or a run position.

7. The vehicle of claim 1, further including a communication module for wireless communication, wherein the BCM is configured to receive the storage-access request from at least one of a key fob, a mobile app, and a remote server via the communication module.

8. The vehicle of claim 1, wherein the BCM is configured to simultaneously relock the rear gate and the storage lock after the predefined period-of-time.

9. The vehicle of claim 1, further including a cabin adjacent to cargo compartment, doors for accessing the cabin, and door locks for the doors.

10. The vehicle of claim 9, further including a door switch located within the cabin.

11. The vehicle of claim 10, wherein the BCM unlocks the doors in response to identifying that the door switch is toggled to an unlock position.

12. The vehicle of claim 10, wherein the BCM simultaneously locks the doors, the rear gate, and the storage device in response to identifying that the door switch is toggled to a lock position.

13. A method comprising:
    receiving a storage-access request via a body control module (BCM) of a vehicle; and
    unlocking a gate and a storage device for a predefined period-of-time responsive to receiving the storage-access request, wherein the storage device is positioned within a cargo compartment and includes a storage lock, the cargo compartment is accessible via the gate, and the gate includes a gate lock,
    wherein the BCM receives the storage-access request when a storage switch is toggled to an unlock position while an ignition sensor detects that an ignition switch is in a start position or a run position.

14. The method of claim 13, wherein the BCM receives the storage-access request, via a communication module of the vehicle, from at least one of a key fob, a mobile app, and a remote server.

15. The method of claim 13, further including relocking the gate and the storage lock via the BCM.

16. The method of claim 15, wherein the BCM relocks the gate and the storage lock after the predefined period-of-time.

17. The method of claim 15, wherein the BCM relocks the gate and the storage lock in response to determining, via a position sensor of the gate, that the gate has been opened and subsequently closed during the predefined period-of-time.

18. The method of claim 15, wherein the BCM relocks the gate and the storage lock in response to identifying that a door switch is toggled to a lock position.

19. A method comprising:
    receiving a storage-access request via a body control module (BCM) of a vehicle; and
    unlocking a gate and a storage device for a predefined period-of-time responsive to receiving the storage-access request, wherein the storage device is positioned within a cargo compartment and includes a storage lock, the cargo compartment is accessible via the gate, and the gate includes a gate lock; and
    relocking the gate and the storage lock via the BCM, wherein the BCM relocks the gate and the storage lock in response to identifying that a door switch is toggled to a lock position.

20. A vehicle comprising:
    an ignition switch and an ignition sensor;
    a rear gate including a gate lock;
    a cargo compartment accessible via the rear gate;
    a cabin adjacent to the cargo compartment and a storage switch located within the cabin;
    a storage device positioned within the cargo compartment and including a storage lock; and
    a body control module (BCM) communicatively coupled to the gate lock and the storage lock, wherein the BCM is configured to simultaneously unlock the rear gate and the storage device for a predefined period-of-time responsive to receiving a storage-access request, and wherein the BCM is configured to receive the storage-access request when the storage switch is toggled to an unlock position while the ignition sensor detects that the ignition switch is in a start position or a run position.

* * * * *